Patented June 13, 1939

2,162,047

UNITED STATES PATENT OFFICE 2,162,047

METHOD AND COMPOUND FOR TREATING MEATS

Hugh E. Allen, Evanston, Ill., assignor of one-half to Albert G. McCaleb, Evanston, Ill.

No Drawing. Application May 14, 1937, Serial No. 142,627

5 Claims. (Cl. 99—16)

My present invention contemplates and provides a method and compound for treating meats, e. g., beef, ham or poultry, which ultimately are to be roasted.

The object of the invention is to provide a method and liquid compound whereby and wherewith a butcher or meat chef, by preliminary treatment of the meats, is enabled to prevent fifty per cent or more of the shrinkage, and practically all of the loss of meat juice and flavor, which heretofore have been unavoidable when meats have been roasted.

A preferred compound wherewith to prepare beef or veal roasts which will not shrink to any noticeable or objectionable degree, and which will lose practically none of their natural juices and flavor, even when very completely roasted, is produced as follows:

200 pounds of concentrated hydrochloric acid (approximately 25% solution) is added to:

(a) 100 pounds corn meal gluten (20% to 24% protein content); or
(b) 100 pounds wheat gluten (20% to 40% protein content); or
(c) 100 pounds soya bean cake (30% to 45% protein content).

The acidulated gluten is then refluxed, or otherwise heated, agitated and circulated, for approximately ten hours at a temperature of from 180° F. to 208° F. The product of the refluxing, or other heating, agitating and circulating operation—being an aqueous menstruum containing, inter alia, a variety of amino and other acids—is then passed through a filter or filters to remove all melanin and humous substances. Some of the glutamic acid content of the menstruum may now be removed, if desired, by any suitable means and procedure. However, removal of glutamic acid, although desirable in order to realize a valuable bi-product, is not necessary to the accomplishment of the purposes of the present invention.

The menstruum is now subjected to neutralizing treatment with sodium hydroxide until but very slightly acidulous to litmus. Next it is completely neutralized with sodium bicarbonate. Finally it is repeatedly filtered until it exhibits a light amber tint and no visible solids. In the final filtrate I have the liquid compound (hereinafter called compound "A") wherewith to prepare beef and veal roasts as hereinafter described.

The liquid compound produced and treated as just described may, if desired, be modified and rendered particularly suitable for use in the preparation of ham roasts by proceeding as follows:

Concentrated wood-smoke tars are recovered from Pyroligneous acid which has been derived from the charcoal of hard woods such as birch, maple, oak or hickory, and which carries its natural wood tar content. This recovery is accomplished by distillation. The pyroligneous acid is distilled until approximately eighty per cent (80%) of its acid content has been removed— the residuum consisting of wood-smoke tars. Some of these wood-smoke tars are water soluble, others are not water soluble.

I next intermix from one-tenth of one per cent ($\frac{1}{10}$ of 1%) to one per cent (1%) of these wood-smoke tars wtih from ninety-nine and nine-tenths per cent (99.9%) to ninety-nine per cent (99%) of the menstruum prepared and treated as hereinbefore described (the percentages being by weight). The addition of the wood-smoke tars to the menstruum is preferably effected in a relatively tall receptacle, e. g., a barrel, which is provided with two valve taps for withdrawing liquid therefrom—one of these taps being located very closely to the bottom of the barrel, and the other being located a substantial distance, for example fourteen inches, above the bottom of the barrel.

The menstruum and its added wood-smoke tars are then violently agitated, by means of a power driven agitator, for a period of approximately fifteen (15) to twenty (20) minutes followed by a period of quiescence. The period of quiescence should not be less than approximately six (6) hours and preferably is as long as forty-eight (48) hours. At the end of the period of quiescence, it will be found that all of the wood-smoke tars which are not water soluble have settled to the bottom of the barrel and hence are no longer entrained in that part of the menstruum which can be decanted through the upper one of the barrel taps. The liquid compound thus decanted (hereinafter called compound "B") is ideal for the treatment of ham roasts in the manner presently to be explained.

A preferred compound wherewith to treat poultry roasts, as hereinafter described, is prepared as follows:

Four (4) to eight (8) ounces of mono-sodium glutamate and eight (8) to sixteen (16) ounces of sodium chloride are dissolved in each gallon of a suitable quantity of sterile (preferably distilled) water. The weight of the sodium chloride should be twice that of the mono-sodium glutamate.

The resultant liquid compound (hereinafter referred to as compound "C") is very interesting per se. Hitherto aqueous solutions of mono-sodium glutamate have been regarded as unstable and inevitably certain to take on unpleasant flavors and give off disagreeable odors under the influences of air, sunlight and varying temperatures. For that reason, food chemists heretofore have meticulously avoided the preparation of aqueous solutions of mono-sodium glutamate which, in the nature of things, could not be used almost immediately after their preparation. But I have discovered that mono-sodium glutamate dissolved with approximately twice its own weight of sodium chloride in a menstruum of sterile (preferably distilled) water will remain stable indefinitely.

Mono-sodium glutamate in simple solution with distilled or otherwise sterilized water is unstable. Mono-sodium glutamate dissolved with sodium chloride in water not absolutely sterile is unstable. Mono-sodium glutamate dissolved in absolutely sterile water with substantially less than twice its own weight of sodium chloride is unstable. But mono-sodium glutamate in a menstruum of sterile (preferably distilled) water with approximately twice its own weight of sodium chloride is stable.

It seems essential that a compound used in practicing the method of the present invention be neutral to litmus and definitely saline, that it contain one or more sodium salts of amino acids, that it have a specific gravity between 1 plus and 2, that it have a boiling point substantially higher than that of water, and that it be capable of developing a very substantial degree of osmotic pressure through meat tissue. Each of the hereinbefore described compounds "A", "B" and "C" meets these requirements. Each is definitely saline and neutral to litmus. Each of compounds "A" and "B" contains various sodium salts of amino acids. Compound "C" contains but one sodium salt of an amino acid—i. e., mono-sodium glutamate. At 68° F. the specific gravity of compounds "A" and "B" is approximately 1.2—that of compound "C" approximately 1.1. The boiling point of compounds "A" and "B" is approximately 226° F.; that of compound "C" approximately 221° F.

A butcher or meat chef practicing the present invention should be provided with a hand pressure pump adapted to discharge its contents through a hollow needle. Usually the pump should be able to receive approximately twenty-four ounces of the liquid compound to be delivered thereby. A pump of this capacity is most suitable in treating beef, veal and ham roasts which are from 8 to 12 pounds in weight.

Let us assume that a ten pound chunk of beef or veal is being prepared to be roasted. The contents of a pump filled with compound "A" (either full strength or diluted with water if the very strong beef-like flavor of the compound is to be rendered less potent) is injected into the meat so as to be localized at a region or regions well removed from the external surfaces of the chunk. If the shape of the meat chunk approximates a cube, or a cylinder which has a length not greatly more or less than its diameter, it usually will suffice to discharge the full content of the pump into the meat chunk at its center of mass. If the chunk is of irregular shape, the contents of the pump may be discharged into two or more internal regions of the chunk.

Pursuant to the pumping of the compound into an internal region (or regions) of the meat chunk as just described, a substantial portion of the aqueous juices normally present in the external regions of the meat chunk recede, by artificially engendered osmosis, to the internal region or regions occupied by the injected compound. Therefore, when the treated roast is placed in an oven at roasting temperature, its external surfaces, containing much less than their normal content of aqueous juices, sear or cauterize very quickly—well before the temperature of the internal region or regions of the roast has attained the boiling point of the injected compound. Such rapid searing or cauterizing of the external surfaces of the roast tends greatly to minimize subsequent losses of aqueous juices and vapors from the roast, and causes the vapor pressure, subsequently developed in the internal region or regions of the roast, to have an inflationary effect, upon the roast as a whole, which to a remarkable degree offsets the normal tendency of the meat to shrink when roasted.

Ham roasts are treated with compound "B" in the same manner that beef and veal roasts are treated with compound "A", and with substantially the same results.

Now let us assume that a poultry roast, weighing approximately 5 to 6 pounds, is being prepared to be roasted. The aforesaid twenty-four ounce pump is filled with compound "C" (either full strength or diluted with water if the strong chicken-like flavor of the compound is to be rendered less potent). The pump needle is inserted into the small end of each leg of the roast and pressed upwardly until it will discharge into the thigh in immediate proximity to the bone. One quarter of the original pump content is pumped into each thigh. Then the pump is pressed deeply into each breast and one quarter of the original pump content is injected into each breast. Compound "C" functions with respect to poultry roasts in substantially the same manner that compounds "A" and "B" function with respect to beef and ham roasts, respectively.

I contemplate that compounds "A" and "C" may be intermixed, before introduction into meats, in any proportions which suit the preference of a butcher or meat chef; also that compound "C" may be introduced into meats other than poultry. Compound "A" has a distinct and pleasing beef-like flavor, compound "C" has a distinct and pleasing chicken-like flavor, and compound "B" has the distinct and pleasing flavor of smoked ham.

Having thus described my invention, what I claim as new and desire to secure by Letters Patent of the United States, is:

1. The method of treating meat in order to minimize roasting shrinkage which consists of giving an internal region of the meat a localized injection of a neutral aqueous solution, which contains salt and at least one sodium salt of an amino acid derived from acid digested vegetable protein, and which is adapted to cause aqueous juices to recede from the external surfaces of the meat by artificially engendered osmosis.

2. The method of treating a poultry roast to minimize roasting shrinkage which consists in giving internal regions of the thighs and breasts of the roast localized injections of a liquid compound comprising mono-sodium glutamate dissolved in water with a greater amount of sodium chloride.

3. The method of treating a ham roast to minimize roasting shrinkage which consists in giving an internal region of the ham a localized injection of a neutral aqueous solution adapted to cause aqueous juices to recede from the external surfaces of the meat by artificially engendered osmosis which contains water soluble wood-smoke tars, sodium salts of amino acids derived from acid-digested vegetable protein and salt.

4. A stable liquid compound for injection into meat roasts, to minimize roasting shrinkage, said compound comprising mono-sodium glutamate dissolved in sterile water with approximately twice its own weight of sodium chloride.

5. A stable liquid compound for injection into meat roasts, to minimize roasting shrinkage, said compound consisting of four to eight ounces of mono-sodium glutamate and eight to sixteen ounces of sodium chloride per gallon of sterile water in which they are dissolved in the ratio of one part of mono-sodium glutamate to two parts of sodium chloride.

HUGH E. ALLEN.